March 17, 1959
H. O. OLSON
2,877,825
TRACTOR SEAT
Filed July 2, 1954
3 Sheets-Sheet 1
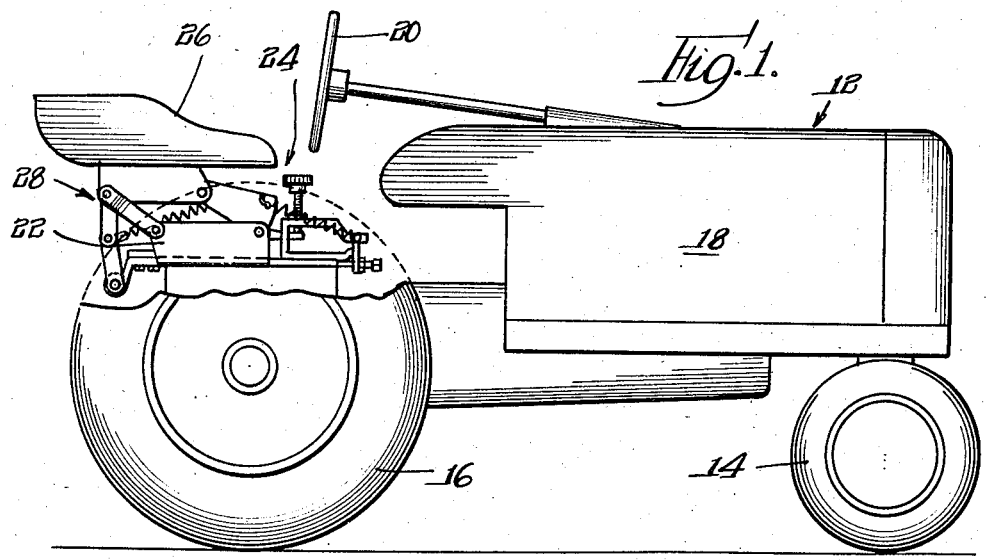
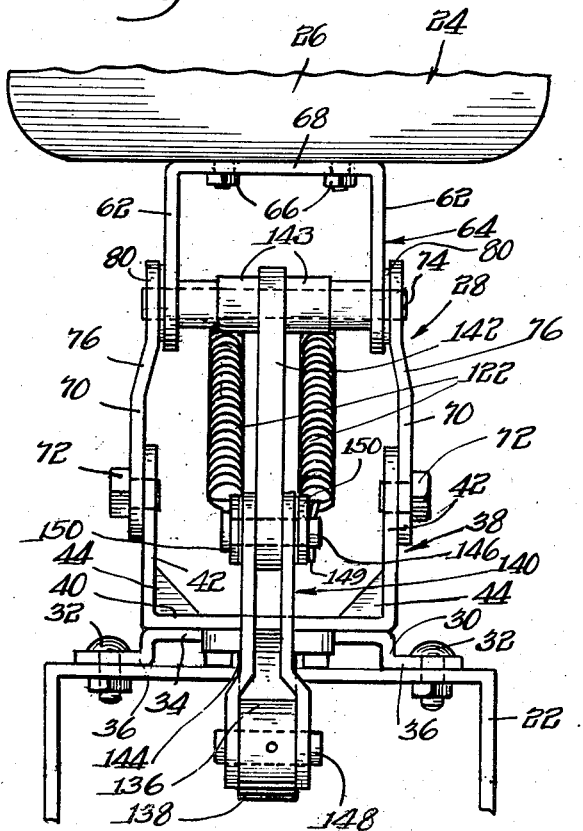
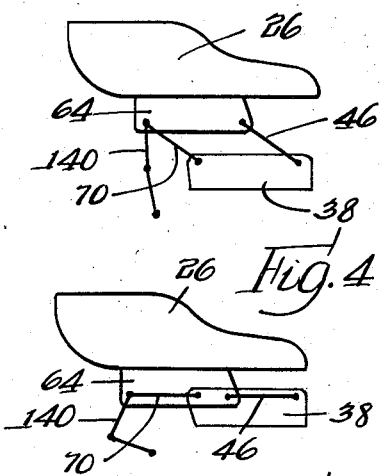
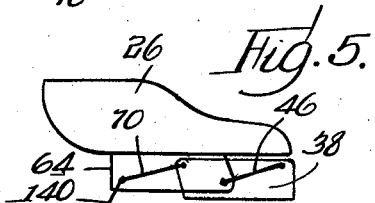
INVENTOR.
Herbert O. Olson
BY
Olson & Trexler
attys.

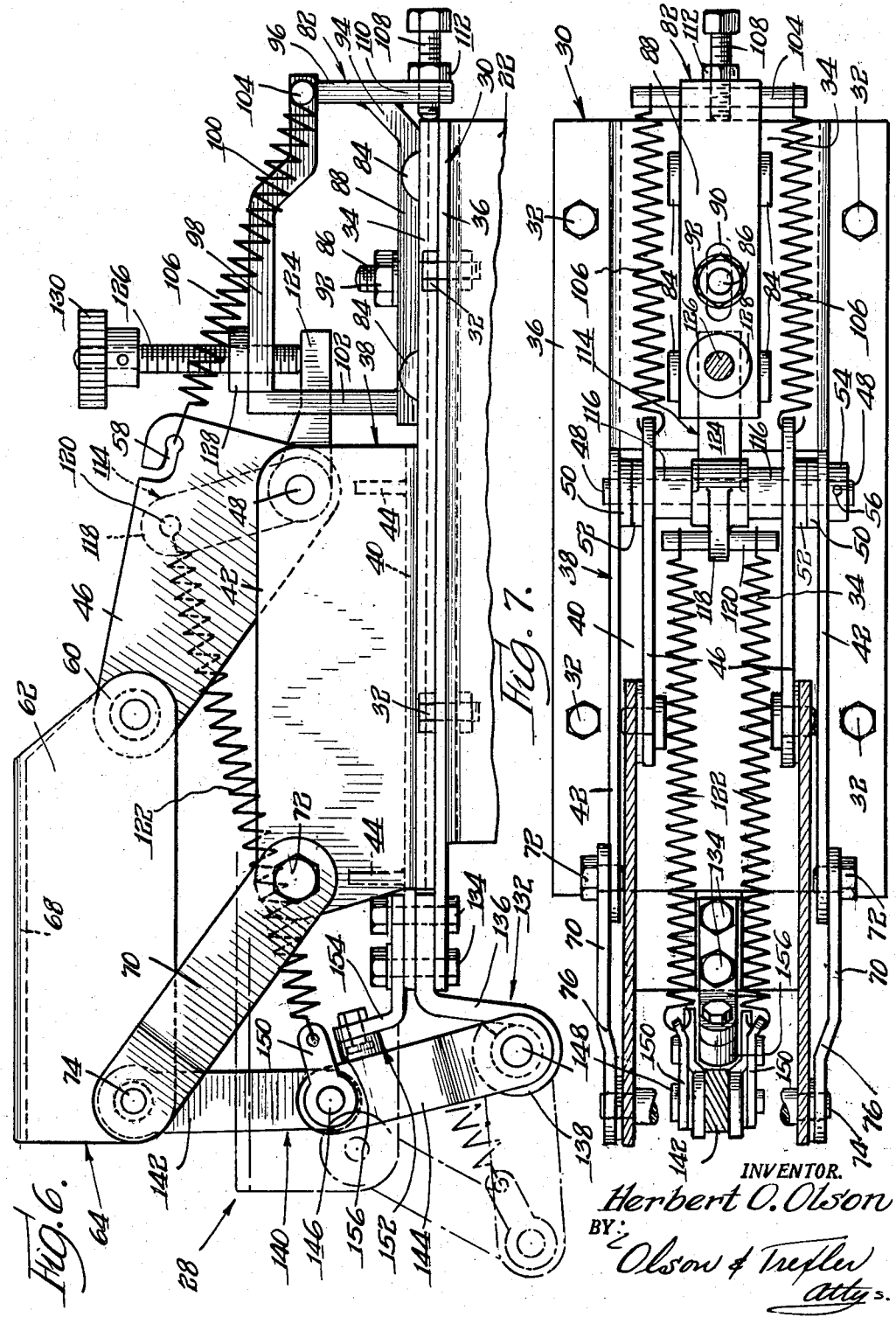

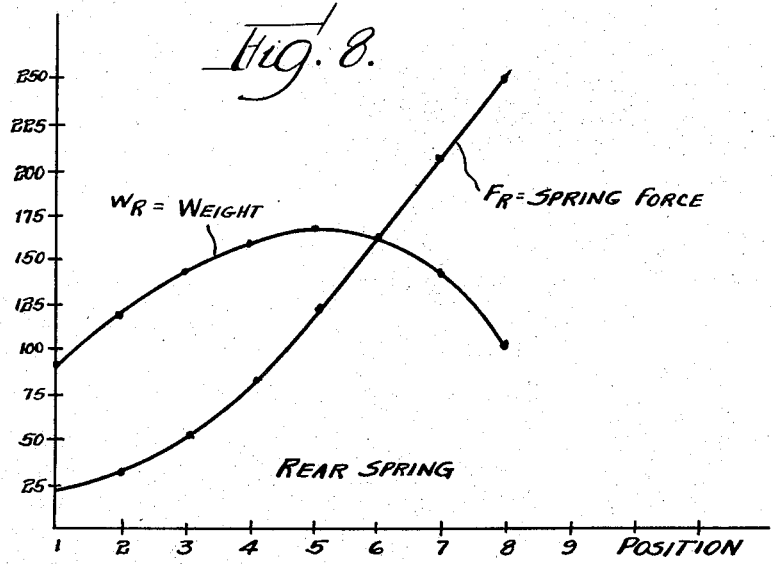
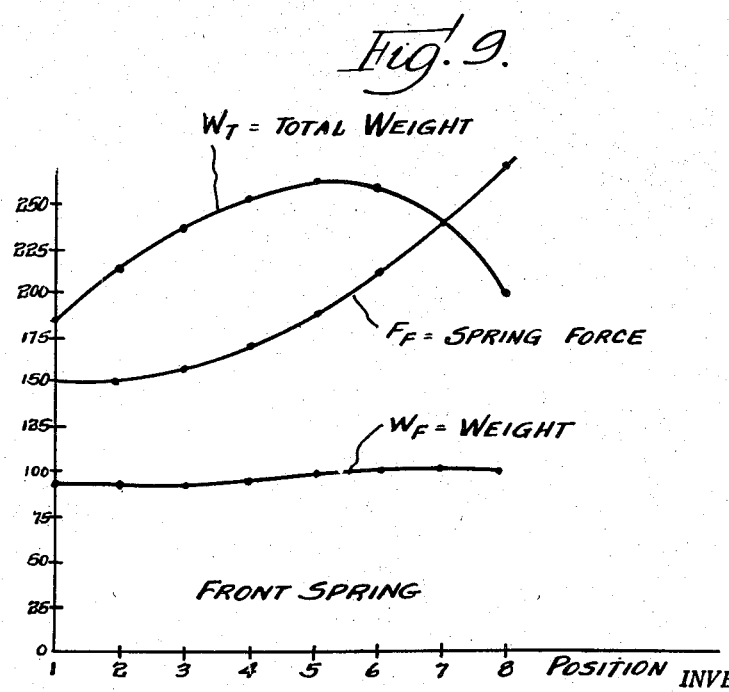

United States Patent Office 2,877,825
Patented Mar. 17, 1959

2,877,825

TRACTOR SEAT

Herbert O. Olson, Rockford, Ill.

Application July 2, 1954, Serial No. 441,029

8 Claims. (Cl. 155—50)

This invention is concerned generally with vehicles such as tractors which heretofore have been noteworthy for their rough riding qualities, and is concerned more particularly with an improved seat for eliminating such rough riding qualities insofar as the driver is concerned.

In automotive vehicles such as automobiles and light trucks there is a large sprung weight, comprising the chassis and body, plus the driver and any passengers, in comparison to the unsprung weight comprising only the wheels and associated parts. Thus, the wheels of such an automotive vehicle generally follow the contours of a supporting surface with no great difficulty, while the mass or inertia of the relatively great sprung weight contains the parts comprising the sprung weight in relatively uniform motion free from bumps and jolts. In many farm vehicles such as tractors, and also in the case of some heavy highway tractors, the situation is largely reversed. The sprung weight is made up almost solely of the seat itself and the operator. There is insufficient mass of the sprung weight to tend to maintain the sprung weight in a constant position, and a bumpy ride results.

Efforts have been made heretofore to provide a tractor seat or the like having improved riding qualities. Such prior seats often have been mounted at the end of a lever arm, and the seat has tilted upon moving up and down, thus requiring the operator alternately to lean forward and back to remain in an upright position. This is extremely tiring for the operator. In addition, prior seats for tractors and the like have utilized relatively simple spring suspensions which have returned the operator to a normal or quiescent position at a rapid and generally accelerating rate, thus tending to catapult the operator out of the seat. Shock absorbers of hydraulic or other types have been utilized to overcome this catapulting tendency and also to overcome the tendency of a sprung seat to oscillate in simple harmonic motion. Unfortunately, shock absorbers wear out and the catapulting and oscillation return. Shock absorbers do not suddenly wear out, but rather wear out gradually. As a result, the trend toward oscillation and catapulting is insidious, and the operator may be severely tired by the tractor or other vehicle, or may actually be injured thereby, before he realizes the shock absorber needs replacement.

It is an object of this invention to provide a seat for a tractor or the like which at all times remains at a substantially constant predetermined angle relative to the axis of the tractor or other vehicle.

It is a further object of this invention to provide a tractor seat which does not rely upon a shock absorber and hence has an extended operating life of substantially constant characteristics.

Yet another object of this invention is to provide a seat for a tractor or the like wherein the seat is supported by a spring and lever arrangement such that the vertical component of motion of the seat as it is restored to rest position is slowed down, whereby to avoid catapulting action.

Yet another object of this invention is to provide a seat for tractors and the like wherein the seat is supported by a spring and toggle lever system such that the vertical component of motion of the seat follows a path determined by the toggle lever part of the lever system, thereby continuously opposing the tendency of gravitational forces to develop free vibration of the mass comprising the seat and the operator.

A corollary object of this invention is to provide a seat for tractors and the like wherein the seat is supported by a system of levers and springs such that all vertical components of motion of the seat and the operator fall entirely in the category of phenomena known as forced vibration, thereby obviating automatically the need for additional devices such as shock absorbers to accomplish this much desired characteristic of vibration wave-train damping or prevention.

It is a further object of this invention, as a practical corollary of the foregoing, to provide a seat for tractors or the like, wherein the seat is supported by a system of springs and levers so arranged and constrained as to prevent over the entire vertical range of motion components the undesirable characteristics of free vibration of the seat and the operator, smoothly and comfortably and without the sudden snubbing effect of auxiliary devices such as shock absorbers.

A further object of this invention is to provide a seat for tractors and the like supported by a plurality of springs having different natural frequencies, whereby each spring damps every other spring to avoid oscillation of the tractor seat.

Yet another object of this invention is to provide a tractor seat or the like having a pair of springs one of which controls the characteristic of the seat motion while the other supports the weight of the operator.

Yet another object of this invention is to provide a tractor seat or the like which is readily adjustable for the weight of an individual operator and which also is readily adjustable to control the ride in accordance with the type of terrain being traversed.

Still another object of this invention is to provide a tractor seat or the like having a pair of restoring springs wherein the restoring capacity of one of the springs is substantially constant in order to control the riding qualities, and the restoring force of the other spring varies in accordance with the movement of the seat from rest position for controlling and providing proper support for the weight of the operator.

Other and further objects and advantages of the present invention will be apparent from the following description when taken in connection with the accompanying drawings wherein:

Fig. 1 is a side view of a tractor mounting my improved seat;

Fig. 2 is an enlarged rear view of the tractor seat and mounting means therefor;

Figs. 3–5 are somewhat diagrammatic views showing the tractor seat in various positions of operation;

Fig. 6 is a side view of the tractor seat mounting mechanism forming the subject matter of this invention;

Fig. 7 is a top view thereof partially in section; and

Figs. 8 and 9 are graphical representations of certain forces involved.

Referring now to the drawings in greater particularity, and first to Fig. 1, there will be seen a vehicle of the type characterized in the past by rough riding qualities and herein illustrated as a tractor 12. The tractor includes the usual components such as front and rear wheels 14 and 16 respectively, a motor casing 18, a steering wheel 20, and a tool box 22. The tractor 12 further is provided with a seat structure 24 forming the subject matter of this invention and including a seat 26 of any suitable or known construction, and supporting and regulating structure 28 therefor.

The supporting structure as best may be seen in Figs. 2, 6 and 7, includes a base plate 30 mounted on top of the tool box 22 by means such as bolts 32 extending through the plate and threaded into the tool box, or into nuts on the opposite or inside of the tool box. The plate 30 as best may be seen in Fig. 2 comprises a raised central channel-like portion 34 with edge flanges 36 displaced therefrom, the flanges 36 contacting the tool box 22 and being secured thereto by the bolts 32.

A channel-shaped bracket 38 is secured to the top of the central portion 34 of the mounting plate by any suitable means such as welding, and includes a web 40 fitting flat against the central plate portion 34, and a pair of flanges 42 upstanding therefrom. The channel-shaped bracket 38 preferably is provided with a plurality of gussets 44 for bracing the flanges onto the web.

A pair of generally triangularly shaped links 46 is pivotally mounted at 48 at the upper forward corners of the flanges 42. Suitable anti-friction bearing material 50 is placed between the flanges 42 and the links 46, and similar anti-friction bearing material is interposed between the pin 48 and the bosses 52 on the links, and also extending into the links to journal the links on the pin 48 with a minimum of friction. A boss 54 is welded to or otherwise secured to the outer surface of one of the flanges 42 and a cross pin 56 extends through this boss and the end of the pin 48 to lock the pin 48 against rotation. The triangularly shaped links 46 are provided at their forward upper corners with L-shaped notches 58 for receiving biasing springs as will be brought out hereinafter. The upper rear corners of the links 46 are pivotally connected at 60 to the downwardly directed flanges 62 of an inverted channel-shaped bracket 64 carrying the seat 26, suitable fastening elements 66 being affixed to the seat 26 and passing through the web 68 of the bracket 64.

A pair of links 70 is pivoted at the upper rear corners of the flanges 42 of the bracket 38 at 72, and this pair of links is pivotally connected to the lower rear corners of the flanges 62 of the seat bracket as at 74. These links 70 may be offset as indicated at 76 in Fig. 2 to provide suitable clearance for the flanges 42 of brackets 38. The links preferably are journaled on pins or bolts 72. The links 70 are journaled on a cross pin 74 carried by the seat bracket 64 and are spaced from the flanges 62 of the seat bracket 64 by means of anti-friction means 80.

The spacing between the pivot points 48 and 72 and the pivot points 60 and 74 is equal. Similarly, the length of the links 46 between the pivot points 48 and 60, and the length of the links 70 between the pivots 72 and 74 is equal. Accordingly, the web 68 of the seat bracket 64 at all times remains parallel to the web 40 of the supporting bracket 38. Since this latter web is parallel to the top of the tool box 22, and the tool box will be understood as being level when the tractor is level, the seat 26 readily will be seen to be level at all times regardless of its vertical position.

An adjustment bracket 82 is mounted at the front of the plate 30 by means of two pairs of spaced apart ears 84 upstanding from the central portion 34 of the plate 30, and by a stud 86 carried by the plate 30. The bracket 82 includes a generally flat bar 88 slidably mounted between the pairs of ears 84 and having a longitudinally elongated slot 90 receiving the stud 86. A nut 92 on the stud holds the bar 88 down, and also helps frictionally to lock the bar in longitudinally adjusted position. The front end of the bar 88 is directed diagonally upwardly as indicated at 94, and a vertical bar 96 is welded thereto. An upper bar 98 having an offset 100 therein has its front end welded to the top end of the vertical bar 96. A rear vertical bar 102 is welded to the rear end of the upper bar 98 and also to the bar 88. The rear vertical bar 102 either is provided with a slot, or comprises a pair of spaced apart strips to provide clearance for a member hereinafter to be discussed.

The upper front corner of the bracket 82 is provided with a transverse pin 104, and springs 106 are stretched between the ends of this pin and the L-shaped slots 58 in the triangular links 46. An adjustment bolt 108 is threaded through the depending lower end 110 of the front vertical bar 96 and bears against the front end of the plate 30 for moving the bracket 82 forwardly or rearwardly to adjust the tension on the springs 106. A jam nut 112 is provided on the bolt 108 for tightening against the depending bar portion 110 to lock the bolt 108 in adjusted position.

A bell crank 114 is pivotally mounted on the pin 48 on which the links 46 are mounted, suitable spacer sleeves 116 being provided to centralize the bell crank. The upper arm 118 of the bell crank is provided with a cross pin 120 for holding the ends of a pair of rearwardly extending springs 122. The lower, forwardly extending arm 124 of the bell crank projects through a slot in the rear vertical bar 102, and the lower end of a screw threaded rod 126 bears against the top of the arm 124. The rod 126 is threaded through the top bar 98 and a boss 128 thereon, and a knurled knob 130 is fixed to the upper end of the rod for threadedly adjusting the same to adjust the tension on the springs 122.

A bracket 132 is secured at the rear end of the rearwardly extending web 40 of the bracket 38 by means such as bolts 134. This bracket includes a depending arm 136 having a curled over lower end as illustrated at 138. A toggle 140 interconnects this curled over lower end and the pivot 74 of the rear links 70. The toggle includes an upper link 142 centralized on the pivot pin 74 by means of spacer sleeve 143. A pair of lower links 144 is pivotally connected to the upper link by means of a pin 146 and a cotter pin 149. The lower links may have their lower ends offset to provide sufficient space to receive the curled over lower end 138 of the bracket 132 between them, and a pin 148 passed through these links and the curled over lower end 138 pivotally supports the links at this position.

Tabs 150 are received on the opposite ends of the toggle pin 146, and the aforementioned springs 122 are connected to these tabs, thus holding the toggle against a stop 152 in the position shown in Fig. 6. The stop comprises a substantially L-shaped bracket 154 mounted on top of the web 40 between the springs 122, and a suitable resilient pad 156 of rubber or the like engageable by the lower links 144 of the toggle. The toggle is held short of a dead center position by the stop so that any weight placed on the seat 24 acts against the springs 122 and 106 to try to break the toggle.

The quiescent or rest position of the seat and supporting structure are shown in full lines in the drawings. The lowermost position is shown in Fig. 6 in dashed lines, and various positions from rest to fully depressed are shown in Figs. 3–5 in a somewhat schematic manner. I have made mathematical calculations of the spring forces and weights involved for eight different positions of the seat and supporting structure. The results of such calculations are reproduced in tabular form below, Table I representing the rear spring and linkage and Table II representing the forward spring and linkage, and also the combined capacity of the springs. For purposes of this table, the results of which are illustrated graphically in Figs. 8 and 9, the pair of rear springs is considered as a single spring, and the pair of front springs is considered as a single spring.

TABLE NO. I
Rear spring and linkage

| $W_{R1}$—$W_{R8}$ | $F_{R1}$—$F_{R8}$ | Extension in inches and load |
|---|---|---|
| Pounds | Pounds | |
| 92.0 | 23.0 | .384 = 23.0# |
| 119.5 | 34.2 | .571 = 34.2# |
| 140.0 | 53.0 | .884 = 53.0# |
| 154.0 | 83.0 | 1.384 = 83.0# |
| 163.0 | 124.0 | 2.071 = 124.0# |
| 160.0 | 165.5 | 2.759 = 165.5# |
| 138.0 | 211.0 | 3.509 = 211.0# |
| 100.0 | 249.0 | 4.134 = 249.0# |

TABLE NO. II
Front spring

| $F_{F1}$—$F_{F8}$ | $W_{F1}$—$W_{F8}$ | Combined Capacity | Extension in inches and load |
|---|---|---|---|
| Pounds | Pounds | Pounds | |
| 150 | 92 | 92 | 2.240 = 150# |
| | | 92 | |
| | | 184 | |
| 154 | 94 | 119.5 | 2.302 = 154# |
| | | 94.0 | |
| | | 213.5 | |
| 160 | 96 | 140.0 | 2.396 = 160# |
| | | 96.0 | |
| | | 236.0 | |
| 171 | 96 | 154.0 | 2.552 = 171# |
| | | 96.0 | |
| | | 250.0 | |
| 190 | 100 | 163 | 2.833 = 190# |
| | | 100 | |
| | | 263 | |
| 213 | 100 | 160 | 3.177 = 213# |
| | | 100 | |
| | | 260 | |
| 242 | 103 | 138 | 3.615 = 242# |
| | | 103 | |
| | | 241 | |
| 274 | 100 | 100 | 4.108 = 274# |
| | | 100 | |
| | | 200 | |

It will be apparent that the construction of the tractor seat supporting structure is such that either of the pair of springs 106 or 122 could hold the seat in its raised or rest position. For best results the weight should be equally supported by the springs with the seat in rest position, and this assumption has been made for the calculations. It is assumed that the average weight of an operator would be 185 lbs., thus being applied approximately 92 lbs. to the front springs and 92 lbs. to the rear springs with the seat in rest position. The dimensions of the supporting structure are such that each of the rear springs will elongate 3.75 inches from rest position of the seat to fully lowered position of the seat, and the equivalent elongation of the front springs will be 1.868 inches. The effective lever arm on which the rear springs act in rest position varies from 3.5 inches at rest position to 1.406 inches at fully lowered position. The driver's weight acting on the rear spring through the toggle 140 acts through a lever arm varying from .875 inch at rest position to 3.50 inches in fully lowered position. Similarly, the force of the front springs acts through an effective lever arm varying from 2.5 inches in rest position to 1.781 inches in fully lowered position. The operator's weight acting on the front spring through the link 46 acts through an effective lever arm varying from 4.06 inches at rest position to 4.875 inches in fully lowered position.

In order to calibrate the spring force necessary to hold the seat in rest position with an operator weighing 185 lbs., the moments of force acting on the lower or rear links 144 in opposite directions are equated, the force due to the operator's weight being set at 92 lbs. This result is shown at the top of the first column near the upper left portion of Table No. I, and it will be seen that the spring must exert a force of 23 lbs. Assuming that with the seat in fully lowered position 7.5 lbs. of restoring force in a vertical direction are to be delivered by the rear springs 122, a similar equation is solved to determine the necessary spring force at position 8, the fully lowered position. The spring force here will be seen at the bottom of the first column to be 249 lbs. The difference in spring force will be seen to be 226 lbs., and it heretofore has been noted that the spring stretches 3.75 inches in moving from a position with the seat fully raised to a position with the seat fully lowered. Thus, the spring will be seen to have a spring force of approximately 60 lbs. per inch of stretch. Utilizing two springs as is done in the illustrative example, each spring must deliver 30 lbs. per inch of stretch. In order to deliver the 23 lbs. of force at the seat raised position, the spring will have to be installed with an initial stretch of .384 inch as is indicated in the upper right portion of Table No. I.

The spring force for the rear springs 122 in eight different positions of stretch ranging from a rest position of the seat to fully lowered position are listed in the left hand column of Table No. I. The calculation for the intermediate positions is made by means of the spring force of 60 lbs. per inch of stretch, and the number of inches of stretch involved in moving to each of the positions. The right hand column shows the inches of stretch equated with the spring force.

The vertical lifting force is of importance with regard to returning the seat to its rest position following lowering under an impact load such as encountered when the tractor is raised by hitting a bump to force the seat up against the operator. The restoring force is equal to the effective weight forcing the seat down, and calculations of such weight are made in the second column (exclusive of the columns bearing the position identifying numerals) of Table No. I. The same equation is utilized for ascertaining this weight force, and this weight force is indicated at $W_1$—$W_8$. It will be seen with reference to Table No. I, that the weight restoring force increases from the initial 92 lbs. to a maximum of somewhat over 163 lbs., and then drops off again to 100 lbs. This is due to the fact that the spring acts through a decreasing lever arm which decreases at a different rate from the rate of increase of spring force due to elongation of the spring.

The spring force just discussed is represented graphically at $F_R$ in Fig. 8, and the weight force is illustrated in the same graph by the curve $W_R$. The tapering off of the weight force upon full depression of the seat prevents the operator from being started back upwardly relative to the tractor at too rapid a rate following movement of the seat to its lowest position. The greatest restoring force is at an intermediate position, and the upward restoring force at rest position is just equal to that necessary to retain the operator in his properly seated position. Furthermore, the upward movement is determined in large measure by the lower links 144 of the toggle and the pivot 146 at the upper end of the lower toggle links is approaching a tangent to a horizontal when the rest position is reached. Thus, the seat is moving upwards rather slowly, and there is no tendency to catapult the operator from the seat.

The spring forces for the front springs are calculated in the same manner, except for the differences in dimensions, and these values are shown in the left column of Table No. II. The right hand column again equates the spring stretch in inches with the spring force in lbs.

The restoring or upward weight forces for the various positions again are calculated and listed in the second column. It will be seen that this weight force remains substantially constant due to the relative decrease in length of lever arm and increase in spring force. Table No. II also lists the total combined restoring or weight force in the second column from the right. The total force of the front springs must be such as to obtain a spring force of approximately 67 lbs. per inch of stretch.

The results of Table No. II are illustrated graphically in Fig. 9. The restoring spring force $F_F$ will be seen to increase on a curve somewhat similar to that of the rear springs. However, the restoring weight force $W_F$ will be seen to be substantially constant, with the result that the total weight restoring force is represented as a curve similar to that of the restoring weight force of the rear springs, but displaced upwardly therefrom.

Inasmuch as the rear springs produce the only substantial variation in weight restoring force, it will be appreciated that the "ride" can be varied to provide more or less restoring force by varying the tension of the rear springs 122. This readily is done by rotating the knurled knob 130 to move the bell crank 114 in one direction or the other, and such adjustment normally would be made in accordance with the terrain being traversed. The weight restoring force due to the front springs always remains equal to approximately half the weight of the operator, and there is no need of changing the tension on the front springs unless the operator is changed. Adjustment of the tension on the front springs by means of the bolt 108 readily can be made to adjust the tractor seat to the weight of any given operator.

There are advantages to the use of the front springs and rear springs in addition to those heretofore enumerated. It has been noted that the rear springs will have a spring rate of approximately 60 lbs. per inch, while the front springs will have a spring rate of approximately 67 lbs. per inch. From this it is obvious that the front springs and the rear springs will have different natural periods of vibration; accordingly, each pair of springs tends to damp vibrations of the other pair of springs, and the seat cannot start oscillating, and cannot move too rapidly in any direction. Thus, a shock absorber is not necessary. However, it is contemplated that under some conditions the shock absorber might be used. Furthermore, if the front springs should break, the tension on the rear springs could be increased to continue the tractor in operation until replacement springs could be obtained. The converse is true regarding the possibility of breakage of the rear springs. Furthermore, this safety feature is augmented by the use of pairs of springs instead of single springs.

From the foregoing it will be seen that my tractor seat at all times remains horizontal relative to the tractor. The vertical movement of the seat slows down as it approaches the rest or fully restored position, and there consequently is no tendency to catapult the operator from the seat. The use of two springs (or sets of springs) causes each spring to damp the other, whereby to avoid the necessity of providing a shock absorber. It will be readily recognized that the spring forces remain substantially constant with age, as opposed to the gradual loss of efficiency of a shock absorber. Furthermore, the two springs give rise to individual adjustments, the rear spring controlling the characteristics of the seat motion, and the other spring being comparatively a constant acting spring supporting the weight, and readily adjustable in changing from one operator or driver to another.

The particular embodiment of my invention herein shown and described is to be understood as being for illustrative purposes only. Various changes in structure will doubtless occur to those skilled in the art, and will be understood as forming a part of my invention insofar as they fall within the spirit and scope of the appended claims.

I claim:
1. Seat supporting structure for use with a tractor or the like comprising means adapted for attachment to the seat of a tractor or the like, means spaced below said seat attachment means and adapted for attachment to a tractor or the like, a plurality of horizontally spaced links pivotally connected to said seat attachment means and to said tractor attachment means for movably interconnecting said seat attachment means and said tractor attachment means, spring means urging said links in a predetermined direction of rotation resiliently to urge said attachment means away from one another, a toggle comprising a pair of links pivotally connected to one another and respectively pivotally attached to said seat attachment means and to said tractor attachment means, additional spring means having a fixed end mounting independent of said links and said seat attachment means and acting on said toggle links and urging said toggle toward a dead center position to maintain said attachment means in horizontally spaced relation, and means limiting movement of said attachment means away from one another with said toggle short of dead center position.

2. Seat supporting structure as set forth in claim 1 wherein the two spring means have different natural frequencies of vibration, whereby said spring means tend to damp one another.

3. Seat supporting structure as set forth in claim 1 wherein the attachment means have a limited position of minimum spacing as well as a limited position of maximum spacing, and wherein the spring force of the spring means acting on the toggle and the effective lever arm on which such spring force works are so correlated as to increase the upward restoring force as the attachment means move apart away from their limited position of minimum spacing, and to increase the upward restoring force as the attachment members approach their limited position of maximum spacing.

4. Seat supporting structure as set forth in claim 1 and further including separate and independent means for adjusting the spring force exerted by the two spring means.

5. Seat supporting structure as set forth in claim 1 wherein the spring means urging the first mentioned links in rotation exerts a spring force exerting a vertical component on the seat attachment means substantially equal to the weight of an operator.

6. Seat supporting structure as set forth in claim 1 wherein the spring means urging the links in rotation act directly on the links.

7. Seat supporting mechanism for use with a tractor or the like, and comprising a seat attachment structure, a tractor attachment structure spaced therebelow, a plurality of horizontally-spaced links pivotally connected to said attachment structures for interconnecting the same for relative movement, spring means having a normally fixed connection with said tractor attachment structure and connecting said links thereto for urging the said links in a direction of rotation tending to relatively resiliently separate said attachment structures, a toggle linkage comprising a pair of links having adjacent ends pivotally joined to one another and with the opposite end of one link pivotally connected to the seat attachment structure and with the opposite end of the other link pivotally connected to the tractor attachment structure, additional spring means having a normally fixed connection with the tractor attachment structure and connecting the pivotal joint of said toggle links thereto for urging said toggle linkage toward a dead center position, and means limiting relative separating movement of said attachment structures with the toggle linkage short of its dead center position.

8. Seat supporting mechanism as claimed in claim 7, wherein the fixed connections between the spring means and the tractor attachment strucure are individually adjustable to vary the effective force of said spring means.

(References on following page)

References Cited in the file of this patent

UNITED STATES PATENTS

| | | | |
|---|---|---|---|
| 750,069 | Stevens | Jan. 19, | 1904 |
| 1,956,108 | Symington et al. | Apr. 24, | 1934 |
| 2,227,717 | Jones | Jan. 7, | 1941 |
| 2,227,764 | Saunders et al. | Jan. 7, | 1941 |
| 2,334,922 | Gustafson | Nov. 23, | 1943 |
| 2,470,907 | White et al. | May 24, | 1949 |
| 2,485,199 | Holtzman | Oct. 18, | 1949 |
| 2,527,905 | Barecki | Oct. 31, | 1950 |
| 2,641,307 | McKinney et al. | June 9, | 1953 |
| 2,663,355 | Harms | Dec. 22, | 1953 |
| 2,707,986 | Johnson | May 10, | 1955 |
| 2,800,948 | Omon et al. | July 30, | 1957 |

FOREIGN PATENTS

| | | | |
|---|---|---|---|
| 15,381 | Great Britain | of | 1890 |
| 106,079 | Great Britain | May 10, | 1917 |
| 607,803 | France | Apr. 6, | 1926 |
| 859,565 | Germany | Dec. 15, | 1952 |